Dec. 23, 1969     L. E. FECHTER     3,485,342
APRON CONVEYOR CLEANER MECHANISM
Filed Aug. 21, 1967     3 Sheets-Sheet 1

INVENTOR.
LEONHARD EMIL FECHTER.
BY
John L. Munday
Attorney

Dec. 23, 1969        L. E. FECHTER        3,485,342

APRON CONVEYOR CLEANER MECHANISM

Filed Aug. 21, 1967        3 Sheets-Sheet 2

INVENTOR.
LEONHARD EMIL FECHTER.
BY John S. Munday
Attorney

INVENTOR.
LEONHARD EMIL FECHTER.

3,485,342
APRON CONVEYOR CLEANER MECHANISM
Leonhard Emil Fechter, Michelbach, Germany, assignor to Passavant-Werke, Michelbacher Hutte, near Michelbach, Nassau, Germany, a corporation of Germany
Filed Aug. 21, 1967, Ser. No. 661,997
Int. Cl. B65g 45/00
U.S. Cl. 198—229　　　　　　　　　　　　　　　7 Claims

ABSTRACT OF THE DISCLOSURE

Apparatus for positively cleaning scraper blades on an apron-type conveyor without limiting the operation, capacity or efficiency of the conveyor. Rotating cleaner blades follow the collecting surface of the scraper blades to clean the same. The apparatus is automatically cut off when it engages particles too large to enter the conveyor.

BACKGROUND OF THE INVENTION

This invention relates to the field of bulk material conveyance and more particularly to the sewage treatment field where wet, bulky, sticky and frequently non-homogeneous material must be conveyed into, out of, or between, various processing stations.

Prior devices for cleaning material from the blades of apron-type conveyors commonly performed the function by beating the blades and the supporting band or chains on which they were mounted or by brushing the blades with a rotating brush made of stiff bristles. The beater type cleaning apparatus is generally inefficient and inconsistent in loosening and removing material from the blades. It is also troublesome in that it imposes additional wear and tear on the machinery which results in greater downtime for repairs and additional higher operating expenses because of the increased cost of repairs, replacement and reduced operating time. In addition, the increased noise accompanying the beating operation is both undesirable and a nuisance.

The use of a rotating stiff bristled brush for cleaning the scraper blades is also inefficient because the brush quickly fills up with wet material and loses its ability to remove additional material from the blades. When the bottom or lower surface portion of the conveyor belt is used to transmit the conveyed materials there is no room for the brush to contact the scraper blades until after the materials have been deposited and the blades are returning to the upper side of the conveyor for their return trip downward for another load of material. The bush, therefore, must clean the blades on the upper surface position which of necessity causes the dislodged material to fall either onto the returning conveyor belt or fall through the equipment, depending on whether the conveyor is a solid continuous band or is comprised of parallel open chain linkages supporting the ends transversely mounted scraper blades. In either case, the efficiency is reduced because the dislodged material is either returned to the area where fresh material is being collected for conveyance upward or it remains within the machinery, thereby clogging the apparatus and possibly endangering the operation by jamming the blades or conveyor belt.

In addition, the brush must rotate against the blades and press against their direction of movement in order to effectively clean them. This increases the total power required to operate the conveyor system.

SUMMARY OF THE INVENTION

The operating problems and inefficiencies associated with apron-type conveyors are obviated by this invention. Instead of carrying materials on top of an endless traveling band, a pair of continuous link chains are mounted parallel in substantially vertical planes to rotate about a corresponding pair of sprocket wheels attached to a shaft rotatably mounted at each end of the conveyor. The center lines of the chains spanning the uppermost portion of the sprocket wheels on each side of the frame, being parallel, define a top surface plane. In like manner, a bottom surface plane is defined by the parallel center lines of the chains spanning the lowermost portion of each set of corresponding sprocket wheels. The direction of movement is such that the top surface plane travels downwardly while the bottom surface plane moves in an upwardly direction.

Equally spaced along the length of the chains are many curved scraper blades having one end mounted to each chain in such manner that the scrapper blade surface lies transversely to the direction of chain movement. The curvature of the scraper blades is in an arc extending outwardly and forwardly, in the direction of conveyor movement, from the point of blade attachment to the conveyor linkages.

At the upper end of the conveyor, a circular plate is mounted on the shaft near each sprocket wheel. Equally spaced on each plate are a plurality of arms which extend beyond the periphery of the sprocket wheels. A cleaner blade is mounted to each arm and extends across the conveyor width transversely to the direction of chain movement and parallel to the shaft and scraper blades. As the sprocket shaft rotates, the cleaner blades rotate down through the top surface plane, between the scraper blades, and approach the bottom surface plane from the inner side. The cleaner blades are aligned about the shaft axis so that each cleaner blade intercepts the bottom surface plane just as a scraper blade arrives at the same point. The cleaner blade contacts the inner edge of the scraper blade and, as the sprockets continues to rotate, traces a path outwardly and forwardly along the same arc formed by the scraper blade. Each scraper blade, therefore, is positively, completely and efficiently cleaned of any material which might have remained stuck to it. This material falls away under the influence of gravity and the blades are uniformly free of accumulations as they reverse direction around the upper pair of sprocket wheels and return to the bottom for another load.

Since virtually no material remains on the blades for the return trip downward, the efficiency of the conveyor is increased. No beating or brushing of the blades is required and no space along the working, or lower, side of the conveyor is utilized for blade cleaning apparatus. Furthermore, once the proper alignment of the cleaning blade with respect to the scraper blade has been made, few, if any, additional adjustments are required regardless of any expansion or elongation of the chain links between the pairs of sprocket wheels. This is because the chain links and cleaner blades are rigidly positioned on the sprocket wheels along with the scraper blades during the cleaning process which is not affected by variations in chain length spanning the sprocket wheels.

Elongation of the continuous chain length due to deformation and the expansion of the lengths is a serious problem in chain link conveyor utilizing other means of cleaning the scraper blades because the cleaning devices are not adapted to intercept the scraper blades uniformly regardless of changes in the chain length. Variations in the timing, positioning and applied force of the cleaning devices on the scraper blades is a cause of excessive wear and inefficient cleaning.

A feature of this invention is the provision of a conveyor scraper blade cleaner mechanism which operates independently of the tension or changes in length of the conveyor chain.

Another feature of this invention is the utilization of a blade cleaning apparatus within the conveyor which neither obstructs the conveyor working area, nor blocks the scraper blade as it is cleaned.

Still another feature of this invention is the provision of curved scraper blades which knife into the material substantially vertically instead of pushing into it sideways so that the material is more easily gathered for conveyance.

An object of this invention is to provide a blade-type conveyor cleaning apparatus which efficiently cleans a blade without beating or imposing excessive wear or tear on the machinery.

Another object of this invention is to provide a blade cleaner in an apron-type conveyor which resists jamming.

Other advantages, objects and features of this invention will readily become apparent when the description of the preferred embodiment is read in conjunction with the accompanying drawings.

DESCRIPTION OF THE PREFERRED EMBODIMENT

Figure 1:
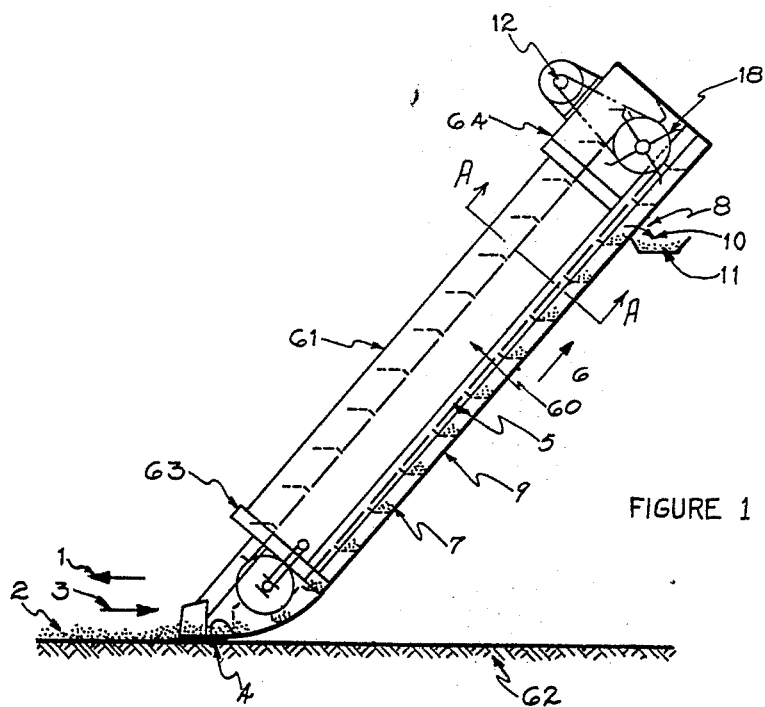
FIGURE 1 is a side elevational view of the conveyor.
Figure 2:
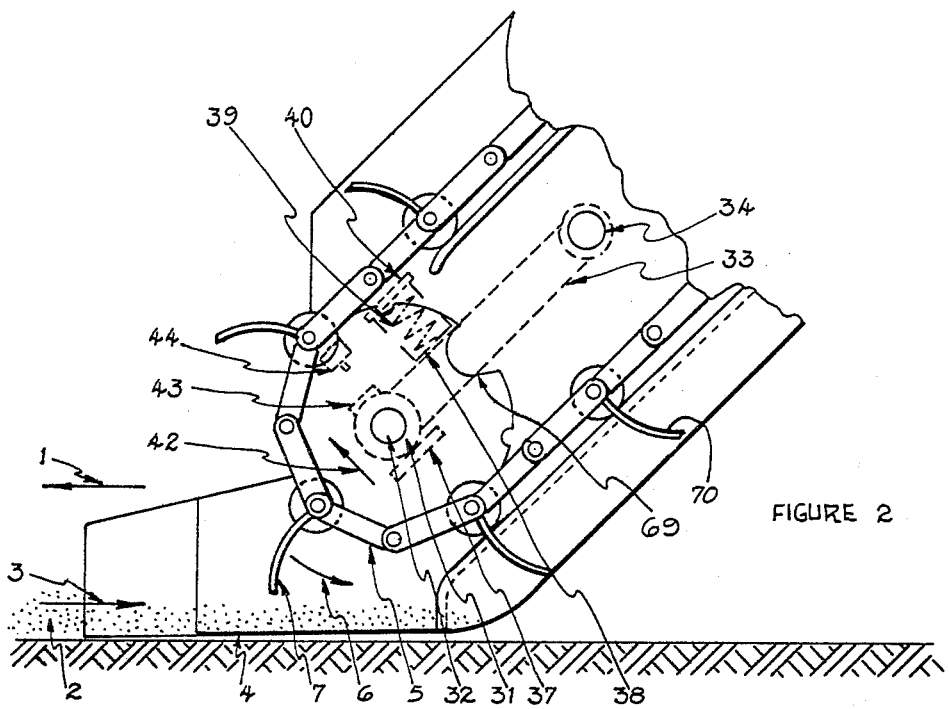
FIGURE 2 is an enlarged side elevational view of the lower portion of the conveyor shown in FIGURE 1, partially broken away for clarification.
Figure 3:
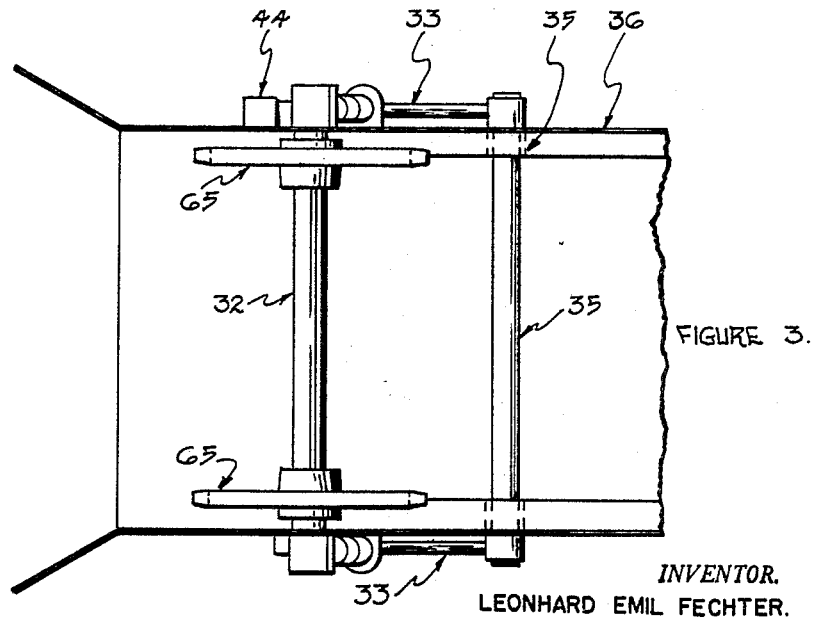
FIGURE 3 is a top view of the portion of the conveyor shown in FIGURE 2.

As shown in FIGURES 1 through 5, a conveyor frame shown generally as item 61 is comprised of parallel sidewalls 36 and a trough-like bottom 9. Conveyor 61 has a lower end 63 and an upper end 64 and is normally positioned with the lower end 63 extending into a tank or pit having a bottom 62 on which a mass of material 2 is deposited. The upper end 64 of conveyor 61 usually extends upwardly out of the container in which material 2 is deposited or at least to another, higher, level within the container. The material 2 to be conveyed can be any type of granulated, crushed or nonhomgeneous material. In the field of waste water, or sewage, treatment, material 2 is generally a wet, sticky sludge.

Near the lower and upper ends 63, 64, respectively, parallel shafts 32, 16, are rotatably mounted in sidewalls 36 with bearings 31, 29.

A pair of sprocket wheels 14, 65 are mounted on each shaft 16, 32, respectively, with each sprocket wheel 14, 65 placed near an end of its shaft so as to be near the inner side of sidewall 36. Each sprocket wheel 14 rotates in a vertical plane substantially coincident with the planes in which corresponding wheels 65 rotate.

An endless link chain 5 is mounted on both sets of corresponding sprocket wheels 14, 65 located in the same vertical plane. Each chain 5 is comprised of an equal number of equal length links 5a. These links 5a and the method in which they are pivotally joined together are commonly known and need not be discussed in detail here. At equally spaced intervals along chains 5, shown as every other link 5a in FIGURE 4, a roller 45 is rotatably mounted to link 5a at the pivot point. At arc lengths 22 on pitch circle diameter 24 on each sprocket wheel 65, 14 a cavity 69 is spaced at a distance equal to the spacing of rollers 45 on chains 5. As the chains move onto the sprocket wheels, each roller 45 is received by a cavity 69 so that the links 5a of chains 5 are fixed on the sprocket wheels as they are turned.

Figure 4:
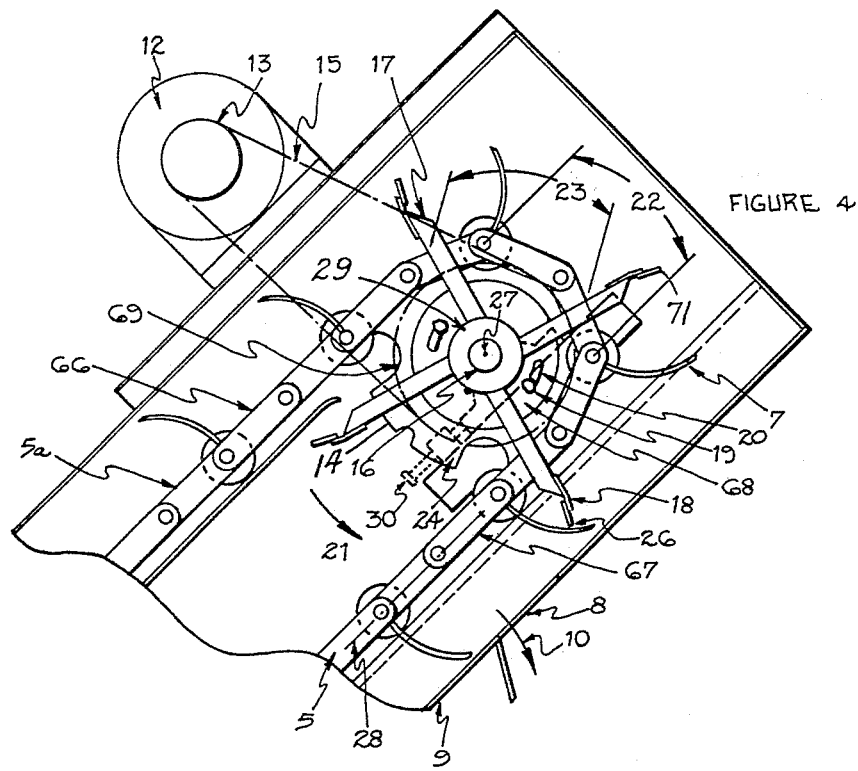
FIGURE 4 is a side elevational view, partially broken away, of the upper end of the conveyor.

The diameters of both wheels in each pair of sprocket wheels 65, 14 are equal. The pivot pins of the two chains 5 which link, and form tangent lines to, the upper sides of corresponding sprocket wheels 14, 65 are, therefore, in the same plane which is defined to be the top surface plane 66. In a similar manner, chains 5 travel in a bottom surface plane 67 linking the lower sides of sprocket wheels 14, 65. The pivot points of links 5a travel in the top and bottom surface planes 66, 67 and, their path on the lower side is shown as 28 in FIGURE 4. The direction of travel is such that the top surface plane 66 moves downwardly while the bottom surface plane 67 moves upwardly. As shown in FIGURE 4, sprocket wheels 14 then rotate counterclockwise in direction 21. Power is supplied by drive motor 12, mounted on frame 61, which drives wheel 14 on sprocket shaft 16 through a chain 15 mounted on drive sprocket 13.

Figure 5:
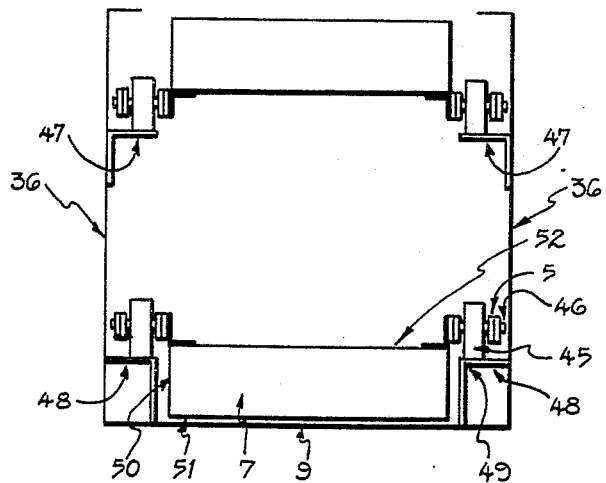
FIGURE 5 is a view of section AA in FIGURE 1.

Scraper blades 7 are mounted to chain links 5a at the same pivot points where rollers 45 are attached and extend between chains 5 transversely to the direction of chain movement. As shown in FIGURE 5, each scraper blade 7 has an inner edge 52, an outer edge 51 and side edges 50. The rollers 45 and chains 5 are outside the side edges 50 so the area swept by scraper blades 7 is unobstructed by any supporting apparatus.

The inner edge 52 of each scraper blade 7 lies just below and parallel to the bottom surface plane 67 on the lower side and just above and parallel to the top surface plane 66 on the upper side. Each scraper blade 7 is curved upwardly and outwardly in an arc from the inner edge 52 in the direction of chain movement 6.

The forward curvature of scraper blades 7 is useful in both slicing into the material 2 and lifting and holding it as the chains move upwardly. The bottom edge of bottom 9 extends outwardly substantially parallel to the bottom 62 to form a paring plate 4 to aid in gathering and supporting the material 2 while it is being collected by scraper blades 7. The curved front surface of scraper blades 7, in the direction of chain movement 6, is defined as the collection surface 70.

Shaft 32 at the lower end 63 is attached to parallel guide shaft 34 with guide arms 33. Guide shaft 34 is rotatably mounted into sidewalls 36 with bearings 35 to allow shaft 32 to pivot upwardly and downwardly in the direction of arrow 42. Downward movement is limited by stop 37 while upward movement beyond a predetermined limit causes stop 43, mounted on the topside of bearings 31, to contact and open limit switch 44 which stops drive motor 12. Resistance to upper movement is provided by two springs 39 attached to arms 33 and which bear against stops 40 on frame walls 36.

To support and guide the chains 5 in the span between sprocket wheels 14, 65, a parallel pair of upper and lower guide tracks 47, 48, respectively, are mounted on the inner side of sidewalls 36. Guide tracks 47, 48 are mounted near and parallel to, top and bottom surface planes 66, 67, respectively, so that rollers 45 bear on them to support the scraper blades 7 in a fixed location with respect to the frame bottom 9. The scraper blades 7 themselves do not bear on any surface so friction during chain movement is minimized and resistance is mainly provided by the weight and cohesiveness of the material 2.

Attached to the inner side of each sprocket wheel 14 is an arm plate 68 mounted on shaft 16. A plurality of stripper arms 17, four in this embodiment, are mounted equally spaced to each plate 68 and extend outwardly beyond the periphery of the sprocket wheels 14. A cleaner blade 18 is positioned transversely to the direction of chain movement 6 and mounted with each end on a corresponding arm stripper 17 at each side of the conveyor frame. Cleaner blades 18 extend outwardly a radial distance at least equal to the radial distance from the center 27 of shaft 16 to the outer edge 51 of scraper blade 7. The angular spacing 23 of arms 17 is equal to the angular spacing 22 of the cavities 69 on sprocket wheels 14.

The angular distance between arms 17 and scraper blades 7, when chain 5 is turning about sprocket wheels 14, is adjustable. A pair of arc-like slots 20 are located through each sprocket wheel 14 at an equal radius from the center 27 of shaft 16. At the same radial distance, a corresponding hole is tapped in each plate 68 and a screw 19 is screwed in to secure plate 68 to sprocket wheel 14. By loosening screws 19, the angular distance between cleaner blades 18 and scraper blades 7 can be varied for reasons described below. The entire upper assembly, including all elements mounted on shaft 16, can be moved laterally upward with respect to frame 61 to tighten chains 5 by turning adjustment screws 30 which support drive shaft bearings 29 within frame 61.

In operation, drive motor 12 turns sprocket wheels 14 in direction 21 which moves the scraper blades 7 in direction 21 downwardly along the top surface plane 66. The conveyor 61 itself may be moved in direction 1 to gather material 2, or the material may be guided in direction 3 onto the paring plate 4 by some external force such as shovels (not shown). When unusually large lumps of material 2 are encountered, or when the material is too dense to allow penetration by scraper blades 7, the entire assembly supported on lower shaft 32 pivots upwardly about shaft 34 against the combined load of its own weight plus the force of springs 39. Then, either the material is broken into portions capable of being conveyed by scraper blades 7, or the pivoted assembly continues to rise in direction 42, as the chains 5 continue to turn scraper blades 7 into material 2, until stop 43 intercepts limit switch 44 which opens and stops drive motor 12.

The safety feature protects the conveyor from attempting to lift chunks of material potentially large enough to be likely to jam the scraper blades 7 or chain links 5a. At the same time, large chunks of material which would otherwise cause jamming, but can be broken up under the cutting pressure of the scraper blades 7, do not interrupt operation.

As scraper blades 7 turn about sprocket wheels 65, their forward curvature aids in allowing them to knife into the material 2 to gather a portion for conveyance. Each scraper blade 7 lifts its portion of material upwardly along the underside of the conveyor. The conveyor bottom 9 prevents any material from returning to the bottom 62. Near the top of the conveyor, an opening 8 is located in bottom 9 and the material 2 is allowed to fall off the blades 7 in direction 10 into a suitable collection vessel 11.

Sticky material might still be clinging to the blades, however. As sprocket wheels 14 rotate, the cleaner blades 18 rotate down through top surface plane 66 and approach bottom surface plane 67 from the inside. The outer edge 71 of cleaner blade 18 arrives at bottom surface plane 67 simultaneously with the inner edge 52 of a scraper blade 7. As shaft 16 continues to rotate, cleaner blade 18 moves upwardly and outwardly, in the direction of rotation, along the collection surface 70 of scraper blade 7. This portion of the cycloid arc is indicated by outer edge 71 of cleaner blade 18 as it emerges below bottom surface plane 67 is identical to the arc of scraper blade 7. This portions of the cycloid arc is indicated by number 26 on FIGURE 4. The distance of cleaner blade 18 from scraper blade 7 is adjustably determined by angularly turning plate 68 relative to sprocket wheel 14 as explained above. The gap between blades 18 and 7 can, therefore, range from direct contact to any practical distance, but in any case, the movement of the outer edge 71 relative to collection surface 70 is always parallel during operation.

This allows the use of different gap distances and materials for cleaner blade 18 to modify and adapt the conveyor to more efficiently handle a particular type of material 2 of known consistency. If direct cleaner blade contact is not required, or if the cleaner blades can be soft or flexible and still properly clean the blades, there will be less wear and longer life can be expected.

Since the cleaner blades 18 contact the scraper blades 7 on the lower side of the conveyor, while chains 5 are still moving upwardly, the material cleaned away also falls away under the influence of gravity. The cleaning process is positive and does not interfere with movement of the scraper blades 7 or the working distance between the floor 62 and the discharge opening 8. Since all the material is stripped from each scraper blade 7, the capacity of each blade returning for another load is maximized and power is not used moving clinging material continuously around the conveyor.

Thus it will be seen that the described apparatus achieves the objects and advantages set forth and avoids the disadvantages and inefficiencies of prior apron-type conveyors. It is to be understood that this invention is not limited to the specific form shown and described in the drawings and description of the preferred embodiment, but covers all modifications and methods falling within the scope of the principles taught.

I claim:

1. Apparatus for collecting bulky materials from a floor surface, conveying and depositing them in a receiving vessel comprising, in combination:

a hollow frame having collection and discharge ends with said collection end positioned in close proximity to the floor surface;

first and second guide means mounted in the frame near the collection and discharge ends, respectively;

a continuous flexible support means movably supported about the first and second guide means, said support means defining upper and lower surface positions as it depends about the first and second guide means;

drive means connected to the support means to move it about the guide means in the direction whereby the upper surface moves downwardly toward the first guide means and the lower surface moves upwardly toward the second guide means;

curved scraper blades mounted to the support means, said blades having a collecting surface, side edges, an inner edge and an outer edge, said collecting surface extending forwardly and outwardly from the flexible support means along a substantially continuously curved arc in the direction of movement of the support means;

cleaner blades mounted to the second guide means and operably connected to the drive means so as to move in cooperation with the flexible support means to intercept each scraper blade and trace a path over the collecting surface thereof, which path is substantially parallel to the said continuously curved arc of the collecting surface and substantially equidistant from the collecting surface as the scraper blade passes from said inner edge to said outer edge, thereby cleaning any accumulated material off the scraper blade as the support means moves about the second guide means.

2. Apparatus as set forth in claim 1 wherein:

the arc of the curved scraper blade is in the form of a cycloid which is identical to the corresponding portion of the path traced by the cleaner blade as it rotates outwardly and forwardly from the lower surface plane.

3. Apparatus as set forth in claim 1, wherein:

said first and second guide means each comprise a pair of sprocket wheels attached to corresponding first and second shafts rotatably mounted in the frame;

said flexible support means comprises a pair of endless link chains mounted parallel about corresponding sprocket wheels on the first and second shafts;

said scraper blades are mounted to the chains, equally spaced, with the collecting surface transverse to the direction of chain movement;

said cleaner blades are mounted on stripper arms which in turn are angularly adjustably mounted on the second pair of sprocket wheels to rotate therewith so that a cleaner blade can be adjusted angularly to intercept the inner edge of each scraper blade and trace said path substantially parallel to the arc of the scraper blade collecting surface to the outer edge as the sprocket wheels rotate.

4. Apparatus as set forth in claim 3, wherein: said stripper arms are equally spaced with respect to each other and radially adjustably positioned as a unit with respect to the sprocket wheels to locate the cleaner blades at a desired distance from the inner edge of the scraper blades as the cleaner blade rotates toward the lower surface plane as the support means approaches the second pair of sprocket wheels under power from the driving means.

5. Apparatus as set forth in claim 2 further including: an upper and lower parallel pair of guide track means mounted within the frame, each pair of guide tracks positioned to closely follow the path of the upper and lower surface planes of the endless chains, respectively;

a plurality of blade support bearing means attached to each endless chain, equally spaced, outside the side edges of the scraper blades and supported on the corresponding guide track means to position and support the chains so as not to interfere with the area swept by the scraper blades as the support means moves.

6. Apparatus as set forth in claim 5 wherein: at least said second pair of guide sprocket wheels includes a plurality of cavities equally spaced angularly about the periphery of the sprocket wheels at a distance equal to the spacing of the blade support bearing means so that each blade support bearing means is received into a cavity on the sprocket wheel, thereby fixing the position of the scraper blades relative to the cleaner blades during the cleaning process independently of any elongation of the chain links.

7. Apparatus as set forth in claim 2, wherein: said first shaft is pivotally mounted in the frame for rotation parallel with the longitudinal axis of the first shaft with downward rotation limited by a stop and upward rotation resisted by adjustable resilient means linking the first shaft with the frame;

a limit switch means is mounted on the frame above the first shaft, said limit switch being intercepted and opened to stop the driving means when the first pair of sprocket wheels are lifted upwardly by an unusually large bulky material entering the collection end of the conveyor.

References Cited

UNITED STATES PATENTS

| | | | |
|---|---|---|---|
| 567,144 | 9/1896 | Ladd | 198—174 X |
| 1,550,365 | 8/1925 | Jones | 198—229 X |
| 2,844,242 | 7/1958 | Panuline | 198—168 |

EDWARD A. SROKA, Primary Examiner

U.S. Cl. X.R.

198—232